(12) United States Patent
Nakajima et al.

(10) Patent No.: US 11,148,472 B2
(45) Date of Patent: Oct. 19, 2021

(54) TYRE

(71) Applicant: Sumitomo Rubber Industries, Ltd., Hyogo (JP)

(72) Inventors: Koichi Nakajima, Kobe (JP); Naoki Ishida, Kobe (JP); Masayuki Fujita, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 206 days.

(21) Appl. No.: 16/297,762

(22) Filed: Mar. 11, 2019

(65) Prior Publication Data

US 2019/0308456 A1  Oct. 10, 2019

(30) Foreign Application Priority Data

Apr. 6, 2018 (JP) .............................. JP2018-074061
Jul. 12, 2018 (JP) .............................. JP2018-132542

(51) Int. Cl.
 *B60C 11/03* (2006.01)
 *B60C 11/01* (2006.01)
 (Continued)

(52) U.S. Cl.
 CPC ............ *B60C 11/01* (2013.01); *B60C 11/032* (2013.01); *B60C 11/0304* (2013.01); *B60C 11/0323* (2013.01); *B60C 11/0327* (2013.01); *B60C 11/042* (2013.01); *B60C 11/045* (2013.01); *B60C 11/1236* (2013.01);
 (Continued)

(58) Field of Classification Search
 CPC ... B60C 11/01; B60C 11/032; B60C 11/0327;
  B60C 11/045; B60C 2011/013; B60C
  2011/0334; B60C 2011/0341; B60C
  2011/0374; B60C 11/0304;
 (Continued)

(56) References Cited

U.S. PATENT DOCUMENTS 3,848,651 A * 11/1974 French ................. B60C 11/042
  152/209.13
4,703,787 A * 11/1987 Ghilardi .............. B60C 11/0323
  152/209.21
(Continued)

FOREIGN PATENT DOCUMENTS

EP  1923234 A1 * 5/2008 ............. B60C 11/12
EP  2 191 984 A2  6/2010
(Continued)

OTHER PUBLICATIONS

Masaoka, JP-09300916—A Machine Translation (Year: 1997).*
(Continued)

*Primary Examiner* — Katelyn W Smith
*Assistant Examiner* — Jack Edmondson Odom
(74) *Attorney, Agent, or Firm* — Studebaker & Brackett PC

(57) ABSTRACT

A tyre includes a tread portion including a tread surface which is provided with grooves. At least one of the grooves includes a widening-width portion at least partially. The widening-width portion includes a first groove portion extending inwardly in a tyre radial direction from the tread surface, and a second groove portion located inwardly in the tyre radial direction of the first groove portion and having a groove width greater than that of the first groove portion.

16 Claims, 17 Drawing Sheets

(51) Int. Cl.
  *B60C 11/04*   (2006.01)
  *B60C 11/12*   (2006.01)
  *B60C 11/13*   (2006.01)
(52) U.S. Cl.
  CPC ..... *B60C 11/1281* (2013.01); *B60C 2011/013* (2013.01); *B60C 2011/0334* (2013.01); *B60C 2011/0341* (2013.01); *B60C 2011/0365* (2013.01); *B60C 2011/0374* (2013.01); *B60C 2011/0381* (2013.01); *B60C 2011/133* (2013.01); *B60C 2011/1338* (2013.01)
(58) Field of Classification Search
  CPC ............. B60C 11/1236; B60C 11/1281; B60C 2011/0381; B60C 2011/133; B60C 2011/1338
  See application file for complete search history.

(56) References Cited

U.S. PATENT DOCUMENTS

| | | | |
|---|---|---|---|
| 9,139,047 B2* | 9/2015 | Terashima | B60C 11/0083 |
| 2006/0254684 A1* | 11/2006 | Tamura | B60C 11/1369 |
| | | | 152/209.18 |
| 2013/0213542 A1* | 8/2013 | Warfford | B60C 11/0327 |
| | | | 152/209.18 |
| 2014/0130950 A1* | 5/2014 | Guichon | B60C 11/13 |
| | | | 152/209.18 |
| 2015/0258858 A1* | 9/2015 | Kujime | B60C 11/1369 |
| | | | 152/209.8 |
| 2016/0152090 A1* | 6/2016 | Takemoto | B60C 11/0306 |
| | | | 152/209.24 |
| 2016/0185160 A1* | 6/2016 | Mukai | B60C 11/1307 |
| | | | 152/209.24 |
| 2017/0120692 A1* | 5/2017 | Durand-Gasselin | B60C 11/0306 |

FOREIGN PATENT DOCUMENTS

| | | |
|---|---|---|
| EP | 2 644 408 A1 | 10/2013 |
| EP | 3 130 481 A1 | 2/2017 |
| JP | 09300916 A * | 11/1997 |
| JP | 2005153655 A * | 6/2005 ......... B60C 11/0323 |
| JP | 2014-196084 A | 10/2014 |
| JP | 2014196084 A * | 10/2014 |
| JP | 2015-024797 A | 2/2015 |
| JP | 2017-509531 A | 4/2017 |
| WO | 2015/150282 A2 | 10/2015 |

OTHER PUBLICATIONS

The extended European search report issued by the European Patent Office dated Jul. 16, 2019, which corresponds to EP19162634.0-1012 and is related to U.S. Appl. No. 16/297,762.

* cited by examiner

TYRE

BACKGROUND ART

Field of the Disclosure

The present disclosure relates to tyres, more particularly to a tyre capable of improving ride comfort and steering stability.

Description of the Related Art

The following Patent document 1 discloses a pneumatic tyre having tread shoulder land portions which are provided with shoulder lug grooves extending from the respective tread edges and terminating within the shoulder land portions. It may be expected that such shoulder lug grooves may improve ride comfort as well as steering stability.
[Patent Document]
[Patent document] JP2015-024797A1

SUMMARY OF THE DISCLOSURE

Unfortunately, the pneumatic tyre disclosed in Patent document 1 has a room for further improvement for ride comfort and steering stability.

The present disclosure has been made in view of the above circumstances and has a major object to provide tyres capable of improving ride comfort and steering stability.

According to one aspect of the disclosure, a tyre includes a tread portion including a tread surface provided with grooves. At least one of the grooves includes a widening-width portion at least partially. The widening-width portion includes a first groove portion extending inwardly in a tyre radial direction from the tread surface, and a second groove portion located inwardly in the tyre radial direction of the first groove portion and having a groove width greater than that of the first groove portion.

In another aspect of the disclosure, the second groove portion may include a curved surface curving in a groove width direction.

In another aspect of the disclosure, the first groove portion may include a pair of plane groove walls arranged in parallel with each other so as to have a constant groove width in the tyre radial direction.

In another aspect of the disclosure, a maximum groove width of the second groove portion may be in a range of from 1.30 to 3.00 times a minimum groove width of the first groove portion.

In another aspect of the disclosure, a length in the tyre radial direction of the first groove portion may be in a range of from 0.15 to 0.70 times a maximum groove depth of the widening-width portion.

In another aspect of the disclosure, a length in the tyre radial direction of the second groove portion may be in a range of from 0.20 to 0.70 times a maximum groove depth of the widening-width portion.

In another aspect of the disclosure, the first groove portion, upon receiving a maximum tyre load, may have a gap between two groove walls thereof.

In another aspect of the disclosure, in the widening-width portion, a groove bottom thereof may have an innermost portion in the tyre radial direction, and the innermost portion may be located on a middle region in a groove width direction of the widening-width portion.

In another aspect of the disclosure, the first groove portion and the second groove portion may extend at respective constant groove widths in a longitudinal direction of the widening-width portion.

In another aspect of the disclosure, the tread portion may include a first tread edge, and the grooves are lateral grooves that open at the first tread edge.

In another aspect of the disclosure, a length in a tyre axial direction of the first groove portion may be equal to or more than 0.70 times a length in the tyre axial direction of the lateral grooves.

In another aspect of the disclosure, the tread portion may include a first shoulder land portion having a first tread edge, the first shoulder land portion may be provided with first shoulder lateral grooves extending inwardly in a tyre axial direction from the first tread edge and terminating within the first shoulder land portion, and the grooves may be the first shoulder lateral grooves.

In another aspect of the disclosure, the first shoulder land portion may include a shoulder surface extending inwardly in the tyre radial direction from the first tread edge, and the first shoulder lateral grooves may include openings on the shoulder surface, and the widening-width portion may include one of the openings.

In another aspect of the disclosure, at least one of the first shoulder lateral grooves may include the widening-width portion, and a non-widening-width portion located inwardly in the tyre axial direction of the widening-width portion, and the non-widening-width portion may have a groove width which is constant or decreases from the tread surface toward a groove bottom thereof.

In another aspect of the disclosure, a groove depth of the non-widening-width portion may decrease inwardly in the tyre axial direction.

In another aspect of the disclosure, a boundary between the widening-width portion and the non-widening-width portion may be located inward in the tyre axial direction with respect to a middle position in the tyre axial direction of the at least one of the first shoulder lateral grooves.

In another aspect of the disclosure, the first shoulder land portion may include a longitudinal edge extending in a tyre circumferential direction on an inner side thereof in the tyre axial direction, the first shoulder land portion may be provided with first shoulder sipes extending from the longitudinal edge and having terminal ends within the first shoulder land portion, and the terminal ends of first shoulder sipes may be located inward in the tyre axial direction with respect to a boundary between the widening-width portion and the non-widening-width portion.

In another aspect of the disclosure, the tread portion may have a designated mounting direction to a vehicle, and the first tread edge may be located on a side away from the center of a vehicle body when the tyre is mounted to a vehicle.

In another aspect of the disclosure, the tread portion may include a second shoulder land portion having a second tread edge located on a side toward the center of a vehicle body when the tyre is mounted to a vehicle, the second shoulder land portion may be provided with second shoulder lateral grooves extending inwardly in the tyre axial direction from the second tread edge and terminating within the second shoulder land portion, and the second shoulder lateral grooves do not include any widening-width portions.

DESCRIPTION OF THE PREFERRED EMBODIMENTS

An embodiment of the present disclosure will be explained below with reference to the accompanying drawings.

Figure 1:
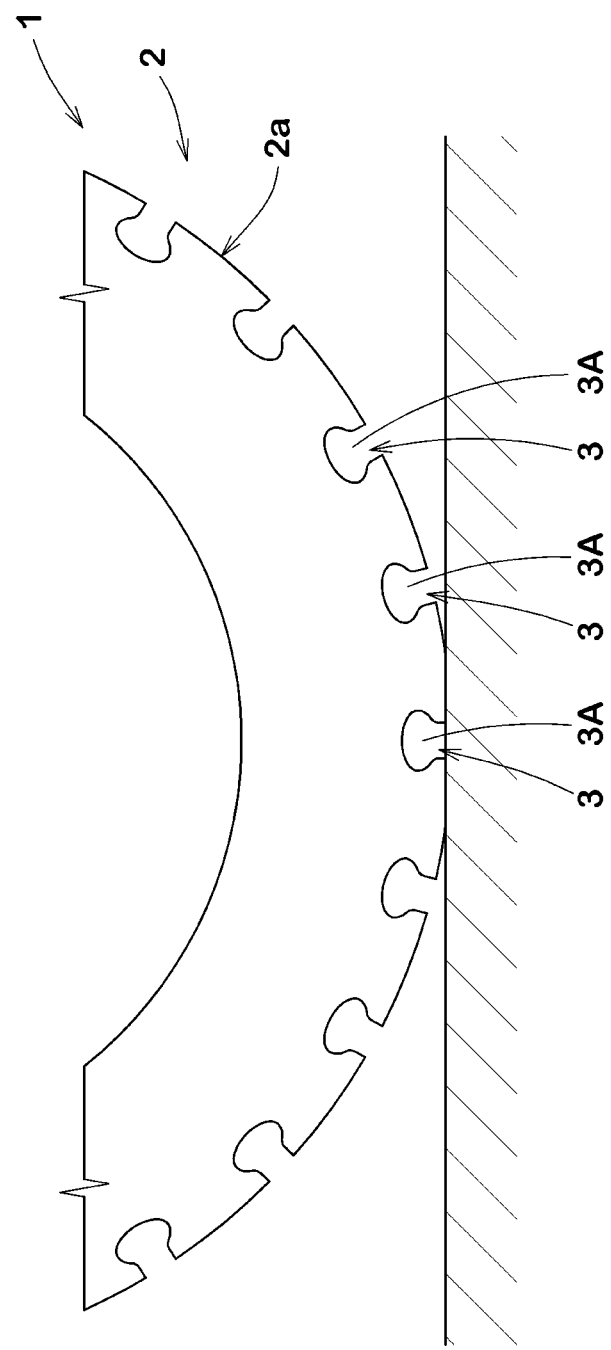
FIG. 1 is a side view of a tyre according to a first embodiment of the disclosure.

FIG. 1 illustrates a side view of a tyre 1 according to a first embodiment of the disclosure.

The tyre 1 according to the present disclosure can be used for various kinds of tyres, e.g., pneumatic tyres for passenger car and heavy-duty vehicle, and non-pneumatic tyres that can support the tyre load by structural members without being inflated with a pressurized air. As illustrated in FIG. 1, the tyre 1 according to the first embodiment includes a tread portion 2 with a tread surface 2a provided with grooves 3. Preferably, at least one of the grooves 3, at least partially, includes a widening-width portion 3A.

Figure 2:
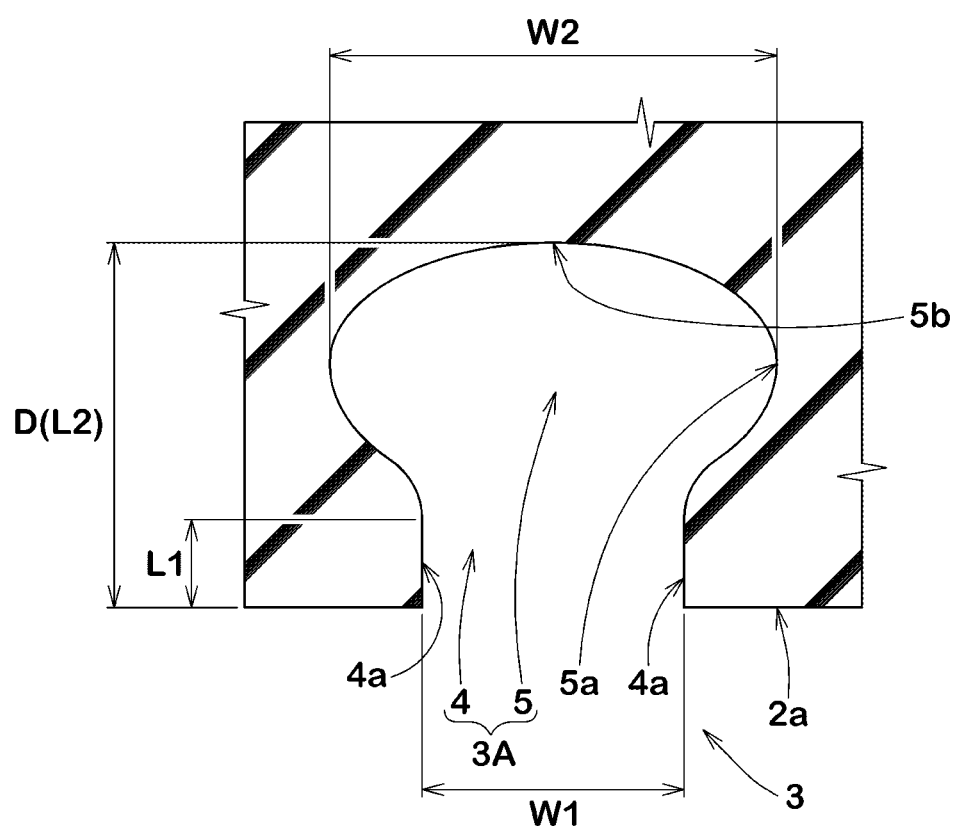
FIG. 2 is a cross-sectional view of a widening-width portion.

FIG. 2 illustrates a cross-sectional view of the widening-width portion 3A. As illustrated in FIG. 2, the widening-width portion 3A according to the first embodiment includes a first groove portion 4 extending inwardly in the tyre radial direction from the tread surface 2a, and a second groove portion 5 located inwardly in the tyre radial direction of the first groove portion 4 and having a groove width greater than that of the first groove portion 4.

The first groove portion 4 provides high stiffness and which can improve steering stability of the tyre 1. Further, the second groove portion 5 has a large cross-sectional area and which can improve ride comfort of the tyre 1. Thus, the tyre 1 according to the first embodiment can improve both ride comfort and steering stability.

In some preferred aspects, the first groove portion 4 is configured to includes a pair of plane groove walls 4a arranged in parallel with each other. Thus, in the first embodiment, the first groove portion 4 has a constant groove width in the tyre radial direction. Such a first groove portion 4 provides high stiffness and which can improve steering stability of the tyre 1. Note that a groove width W1 when the first groove portion 4 has no parallel plane groove walls 4a refers to a minimum groove width between a pair of groove walls which configures the first groove portion 4.

As used herein, dimensions of respective portions of the tyre 1 are values measured under a normal state unless otherwise noted. As used herein, the normal state is such that the tyre 1 is mounted on a standard wheel rim with a standard pressure but is loaded with no tyre load.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

In the first embodiment, the second groove portion 5 has a groove width W2 greater than the groove width W1 of the first groove portion 4. Note that the groove width W2 of the second groove portion 5 refers to a maximum groove width between a pair of groove walls which configures the second groove portion 5. Preferably, the second groove portion 5 includes a curved surface 5a curving in the groove width direction. Such a second groove portion 5 including the curved surface 5a curving in the groove width direction mitigates reduction in stiffness thereof, and thus improves ride comfort of the tyre 1 as well as steering stability.

Preferably, the widening-width portion 3A has a groove bottom 5b in the second groove portion 5. The groove bottom 5b is a portion positioned innermost in the tyre radial direction of the groove. The groove bottom 5b, for example, is located on a middle region in the groove width direction of the widening-width portion.

Preferably, the groove width W2 of the second groove portion 5 is in a range of from 1.30 to 3.00 times the groove width W1 of the first groove portion 4. When the groove width W2 of the second groove portion 5 is less than 1.30 times the groove width W1 of the first groove portion 4, the groove width W1 of the first groove portion 4 becomes relatively wider, and thus there is a risk that steering stability of the tyre 1 may not improve. When the groove width W2 of the second groove portion 5 is more than 3.00 times the groove width W1 of the first groove portion 4, the groove width W1 of the first groove portion 4 becomes relatively narrower, and thus there is a risk that the pair of plane groove walls 4a comes into contact with each other so that stiffness increases drastically upon receiving a maximum tyre load.

Preferably, a length L1 in the tyre radial direction of the first groove portion 4 is in a range of from 0.15 to 0.70 times a maximum groove depth D of the widening-width portion 3A. Note that the groove depth D of the widening-width portion 3A refers to a maximum depth from the tread surface 2a to the groove bottom 5b in the tyre radial direction. When the length L1 in the tyre radial direction of the first groove portion 4 is less than 0.15 times the groove depth D of the widening-width portion 3A, stiffness of the first groove portion 4 is not enhanced, and thus there is a risk that steering stability of the tyre 1 may not improve. When the length L1 in the tyre radial direction of the first groove portion 4 is more than 0.70 times the groove depth D of the widening-width portion 3A, stiffness of the first groove portion 4 is prone to be high, and thus there is a risk that ride comfort of the tyre 1 may be deteriorated.

Figure 3:
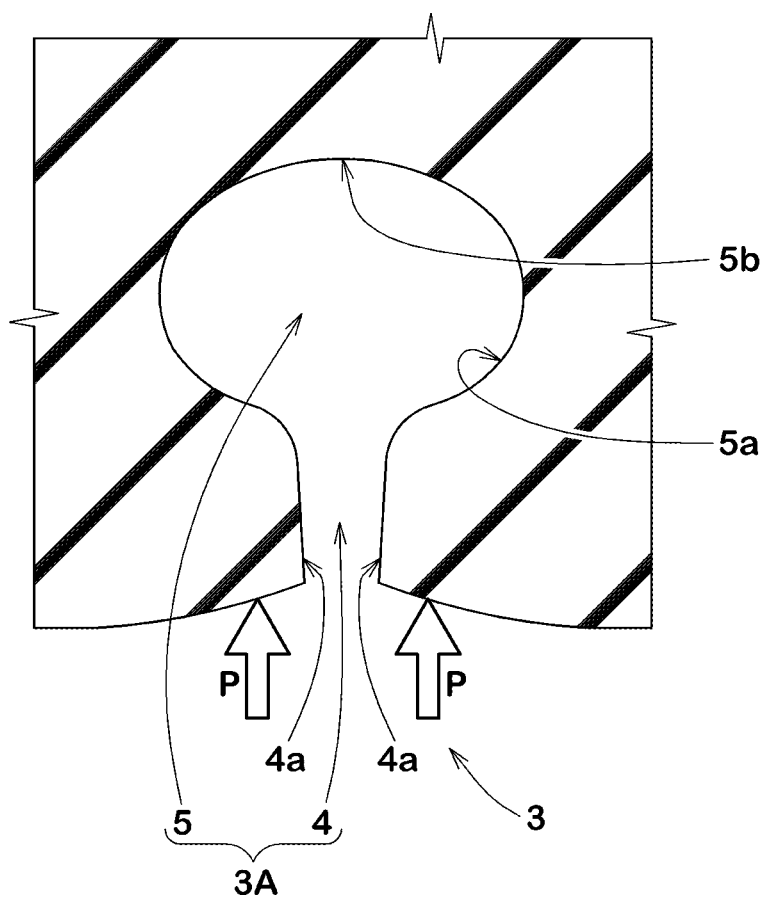
FIG. 3 is a cross-sectional view of the widening-width portion when grounding.

FIG. 3 illustrates a cross-sectional view of the widening-width portion 3A upon grounding. As illustrated in FIG. 3, the first groove portion 4 of the widening-width portion 3A, even when receiving the maximum load P, preferably keeps a gap between the groove walls 4a in the groove width direction. Such a first groove portion 4 can suppress drastic stiffness change caused by which the pair of plane groove walls 4a comes into contact with each other upon receiving the maximum load P.

Preferably, the second groove portion 5 of the widening-width portion 3A, even when receiving the maximum load P, keeps a gap in the tyre radial direction. Such a second groove portion 5 can suppress drastic stiffness change caused by which the curved surface 5a comes into contact with the groove bottom 5b upon receiving the maximum load P. Thus, the tyre 1 according to the first embodiment can maintain better ride comfort even when the maximum load P occurs.

Figure 4:
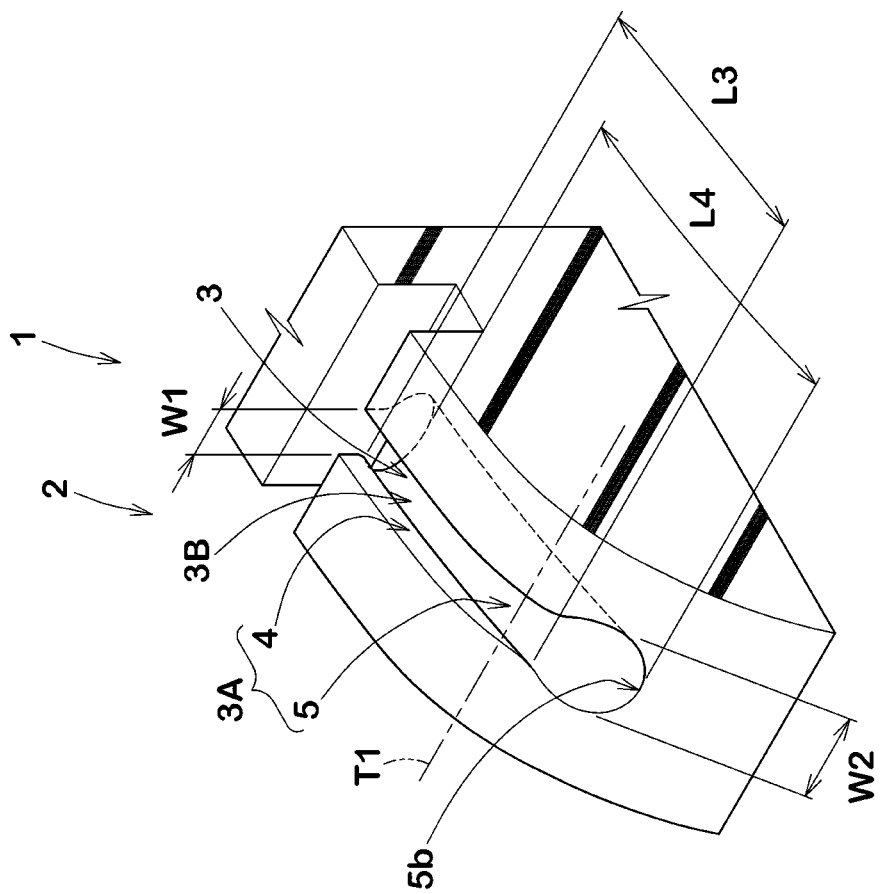
FIG. 4 is a perspective view of a groove.

FIG. 4 illustrates a perspective view of one groove 3. As illustrated in FIG. 4, the grooves 3 according to the first embodiment include one or more lateral grooves 3B which open at a first tread edge T1 of the tread portion 2. As used herein, "the first tread edge T1" is defined as one of axially outermost edges of the ground contacting patch of the tread portion 2 which occurs under the normal state with a standard tyre load when the camber angle of the tyre is zero.

The standard tyre load is a tyre load officially approved for each tyre by standards organizations in which the tyre 1 is based, wherein the standard tyre load is the "maximum load capacity" in JATMA, the maximum value given in the above-mentioned table in TRA, the "Load Capacity" in ETRTO, for example.

In the first embodiment, the entire region of each lateral groove 3B is configured as the widening-width portion 3A. Preferably, a length L3 in the tyre axial direction of the first groove portion 4 may be equal to or more than 0.70 times a length L4 in the tyre axial direction of the lateral groove 3B. Note that the length L4 of lateral groove 3B refers to a length in the tyre axial direction of the groove bottom 5b of widening-width portion 3A.

As illustrated in FIG. 2 and FIG. 4, in the widening-width portion 3A, the first groove portion 4 and the second groove portion 5 preferably extend at respective constant groove widths W1 and W2 in the longitudinal direction of the widening-width portion 3A. Such a widening-width portion 3A can maintain stiffness of the tyre 1 uniformly in the longitudinal direction of the widening-width portion 3A, improving grip performance of the tyre 1.

Figure 5:
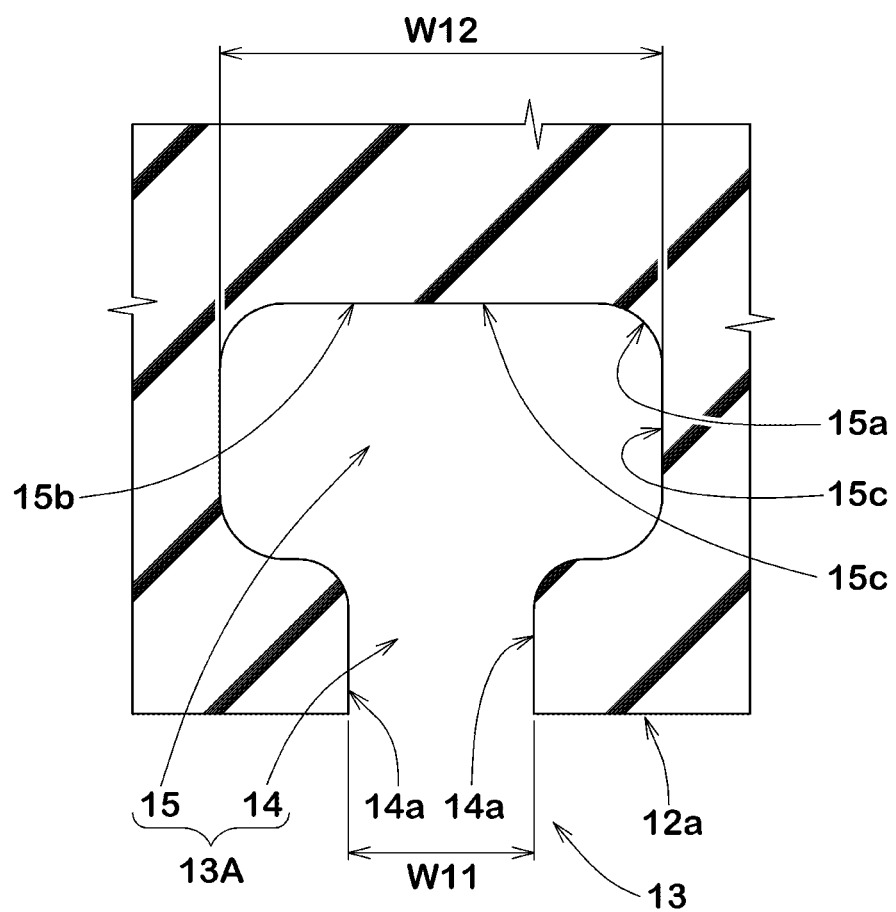
FIG. 5 is a cross-sectional view of a groove according to a second embodiment of the disclosure.

FIG. 5 illustrates a cross-sectional view of a groove 13 according to a second embodiment of the disclosure. As illustrated in FIG. 5, preferably, the groove 13 includes the widening-width portion 13A at least partially. In the second embodiment, the widening-width portion 13A includes a first groove portion 14 extending inwardly in the tyre radial direction from the tread surface 12a, and a second groove portion 15 located inwardly in the tyre radial direction of the first groove portion 14 and having a groove width greater than that of the first groove portion 14.

Preferably, the first groove portion 14 includes a pair of plane groove walls 14a in parallel with each other. Thus, in the second embodiment, the first groove portion 14 has a constant groove width W1 in the tyre radial direction. Such a first groove portion 14 provides high stiffness and which can improve steering stability of the tyre 1. Note that a groove width W11 when the first groove portion 14 has no parallel plane groove walls 14a refers to a minimum groove width between a pair of groove walls which configures the first groove portion 14.

In the second embodiment, the second groove portion 15 has a groove width W12 greater than the groove width W11 of the first groove portion 14. Note that the groove width W12 of the second groove portion 15 refers to a maximum groove width between a pair of groove walls which configures the second groove portion 15. Preferably, the second groove portion 15 includes a curved surface 15a curving in the groove width direction. In the second embodiment, the second groove portion 15 further includes a plane 15c connected to the curved surface 15a smoothly.

Such a second groove portion 15 has a large cross-sectional area and can improve drainage performance and ride comfort of the tyre 1. Further, the second groove portion 15 which includes the curved surface 15a curving in the groove width direction mitigates reduction in stiffness thereof, and thus improves ride comfort of the tyre 1 as well as steering stability.

Preferably, the widening-width portion 13A has a groove bottom 15b in the second groove portion 15. The groove bottom 15b is a portion positioned innermost in the tyre radial direction. The groove bottom 15b of widening-width portion 13A, for example, forms a flat plane surface 15c extending in the groove width direction. Since the widening-width portion 13A has the groove bottom 15b formed as the flat plane surface, it can provide a large cross-sectional area to improve drainage performance of the tyre 1.

Figure 6:
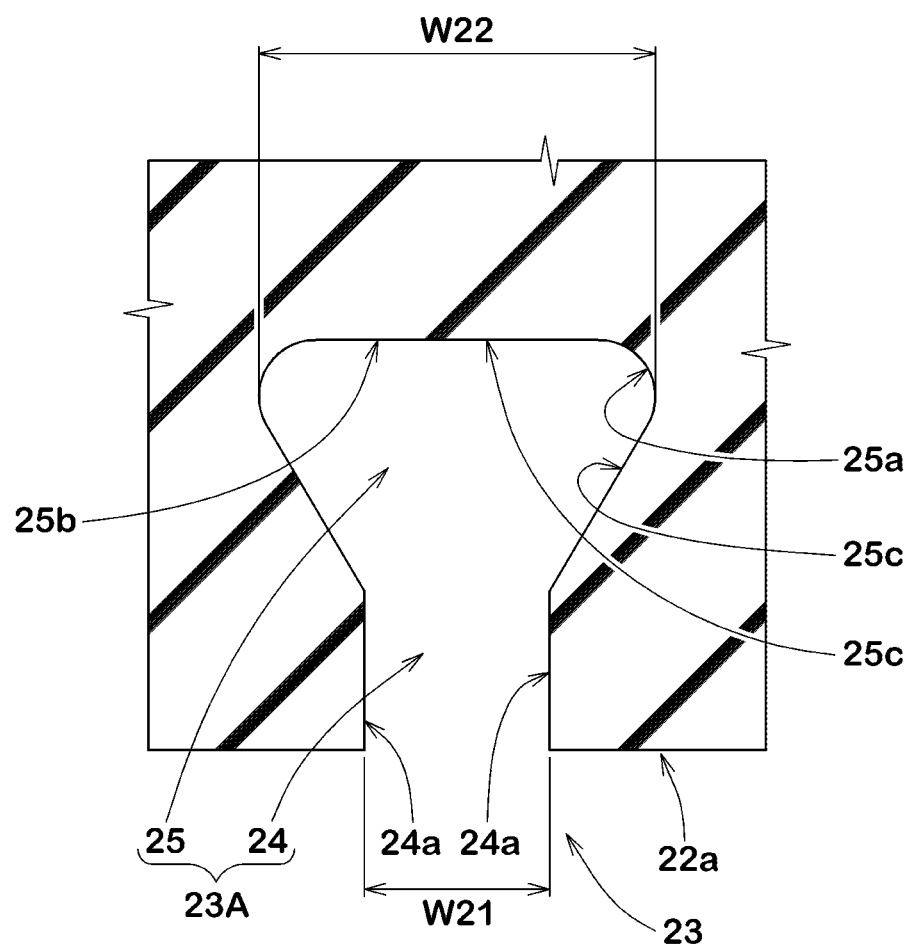
FIG. 6 is a cross-sectional view of a groove according to a third embodiment of the disclosure.

FIG. 6 illustrates a cross-sectional view of a groove 23 according to a third embodiment of the disclosure. As illustrated in FIG. 6, the groove 23 includes the widening-width portion 23A at least partially. In the third embodiment, the widening-width portion 23A includes a first groove portion 24 extending inwardly in the tyre radial direction from the tread surface 22a, and a second groove portion 25 located inwardly in the tyre radial direction of the first groove portion 24 and having a groove width greater than that of the first groove portion 24.

Preferably, the first groove portion 24 includes a pair of plane groove walls 24a arranged in parallel with each other. In the third embodiment, due to the plane groove walls 24a, has a constant groove width W21 in the tyre radial direction. Such a first groove portion 24 has high stiffness which can improve steering stability of the tyre 1. Note that a groove width W21 when the first groove portion 24 has no parallel plane groove walls 24a refers to a minimum groove width between a pair of groove walls which configures the first groove portion 24.

In the third embodiment, the second groove portion 25 has a groove width W22 greater than the groove width W21 of the first groove portion 24. Note that the groove width W22 of the second groove portion 25 refers to a maximum groove width between a pair of groove walls which configures the second groove portion 25. The second groove portion 25 includes a curved surface 25a curving in the groove width direction. In the third embodiment, the second groove portion 25 further includes a plane 25c connected to the curved surface 25a smoothly.

Such a second groove portion 25 has a large cross-sectional area and can improve drainage performance and ride comfort of the tyre 1. Further, the second groove portion 25 which includes the curved surface 25a curving in the groove width direction mitigates reduction in stiffness thereof, and thus improves ride comfort of the tyre 1 as well as steering stability.

Preferably, the widening-width portion 23A has a groove bottom 25b in the second groove portion 25. The groove bottom 25b is a portion of the groove positioned innermost in the tyre radial direction. The groove bottom 25b of widening-width portion 13A, for example, forms a flat plane surface 25c extending in the groove width direction. Since the widening-width portion 23A has the groove bottom 15b formed as the flat plane surface 25c, it can provide a large cross-sectional area to improve drainage performance of the tyre 1.

Figure 7:
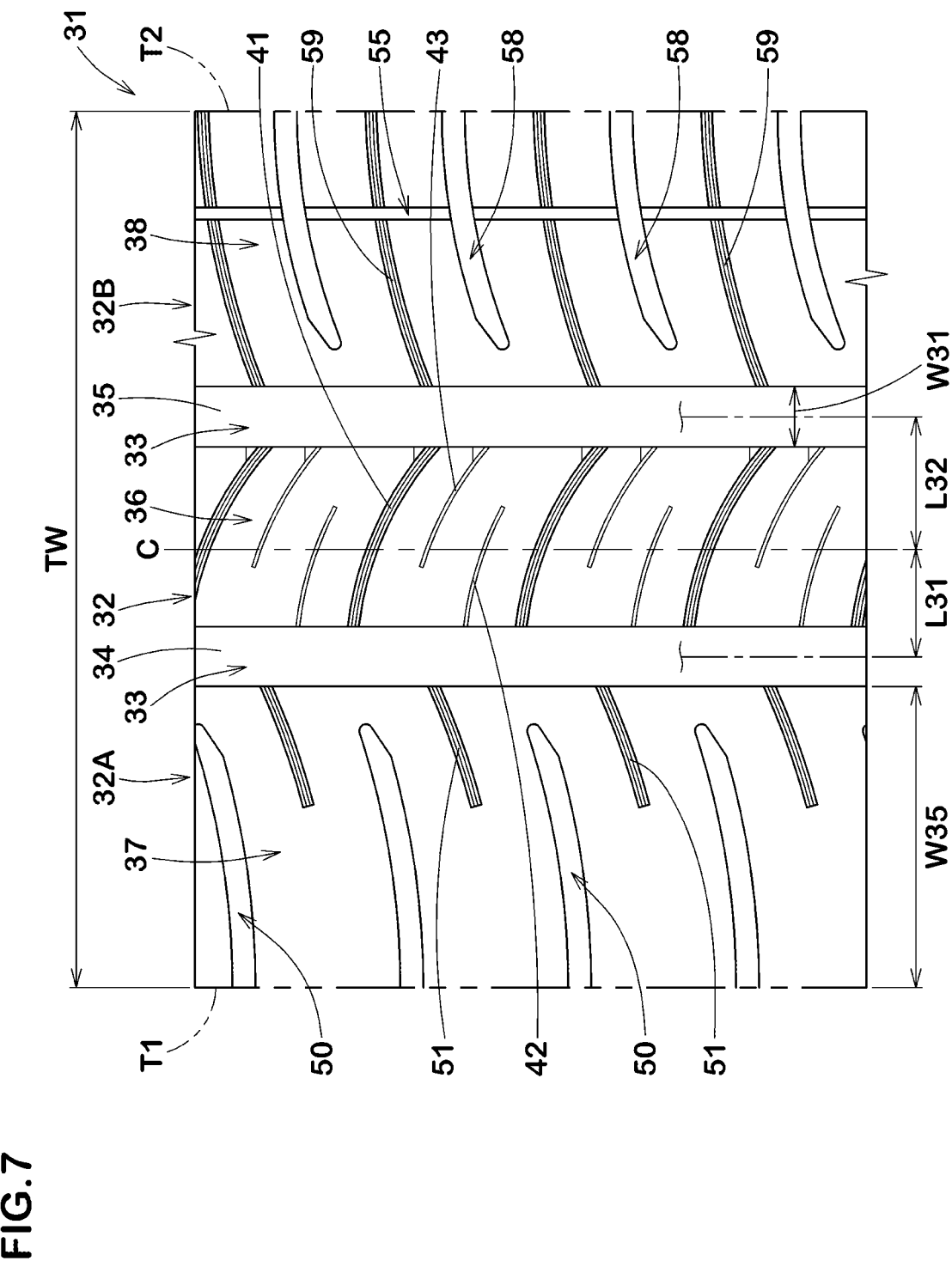
FIG. 7 is a development view of a tyre according to a fourth embodiment of the disclosure.

FIG. 7 illustrates a development view of a tread portion 32 according to a fourth embodiment of a tyre 31. As illustrated in FIG. 7, the tyre 31, for example, is embodied as a pneumatic tyre for passenger car. Note that the fourth embodiment is not limited to such an aspect.

The tyre according to the fourth embodiment has a designated mounting direction to a vehicle. The designated mounting direction to a vehicle, for example, may be indicated using letters or a mark on a tyre sidewall portion (not illustrated). When the tyre 31 is mounted to a vehicle, in FIG. 7 the right side corresponds to an inboard side of the vehicle and the left side corresponds to an outboard side of the vehicle.

The tread portion 32 includes the first tread edge T1 and a second tread edge T2. As used herein, "the second tread edge T2", when the tyre is a pneumatic tyre, is defined as the other one of axially outermost edges of the ground contacting patch of the tread portion 32 which occurs under the normal state with the standard tyre load when the camber angle of the tyre 31 is zero.

In the fourth embodiment, the first tread edge T1 is located on a side away from the center of a vehicle body when the tyre 31 is mounted to a vehicle, and the second tread edge T2 is located on a side toward the center of the vehicle body when the tyre 31 is mounted to a vehicle. The tread portion 32 includes an outboard tread portion 32A defined between the tyre equator C and the first tread edge T1, and an inboard tread portion 32B defined between the tyre equator C and the second tread edge T2. Note that "tyre equator C" refers to the center location in the tyre axial direction between the first tread edge T1 and the second tread edge T2 under the normal state.

In the fourth embodiment, the tread portion 32 is provided with a circumferentially and continuously extending main grooves 33. The main grooves 33 extend in the tyre circumferential direction with relatively large widths and depths in order to disperse water backwardly of the tyre.

In some preferred embodiments, each main groove 33 has a groove depth and a groove width both of which are equal to or more than 5 mm, more preferably equal to or more than 6 mm. Further, the main grooves 33 preferably have groove widths W31 in a range of from 5.0% to 9.0% of the tread width TW. The depths of the main grooves 33 are preferably in a range of from 5 to 12 mm. As used herein, the tread width TW is an axial distance from the first tread edge T1 to the second tread edge T2 under the normal state.

In the fourth embodiment, each main groove 33 extends in a straight manner in the tyre circumferential direction. In another aspect, each main groove 33 may extend in a non-straight manner, e.g., zigzag or wavy shapes.

Preferably, the main grooves 33 include a first crown main groove 34 and a second crown main groove 35 arranged such that the tyre equator C is located therebetween. The first crown main groove 34, for example, is arranged between the tyre equator C and the first tread edge T1. The second crown main groove 35, for example, is arranged between the tyre equator C and the second tread edge T2.

A distance L31 in the tyre axial direction from the tyre equator C to the groove centerline of the first crown main groove 34 and a distance L32 in the tyre axial direction from the tyre equator C to the groove centerline of the second crown main groove 35 are preferably in a range of from 0.08 to 0.20 times the tread width TW. Further, in the fourth embodiment, the distance L31 is shorter than the distance L32.

Preferably, the tread portion 32 is divided into a crown land portion 36, a first shoulder land portion 37, and a second shoulder land portion 38 by the main grooves 33. The crown land portion 36, for example, is defined between the first crown main groove 34 and the second crown main groove 35. The first shoulder land portion 37, for example, is defined between the first crown main groove 34 and the first tread edge T1. The second shoulder land portion 38, for example, is defined between the second crown main groove 35 and the second tread edge T2. In the fourth embodiment, the first shoulder land portion 37 is located on the outboard side, which is away from the center of a vehicle body of a vehicle, when the tyre 31 is mounted to the vehicle.

Preferably, the first shoulder land portion 37 has an axial width which is the largest among the three land portions. Such a first shoulder land portion 37 provides high stiffness, improving steering stability while maintaining better uneven wear resistance. Preferably, a width W35 in the tyre axial direction of the first shoulder land portion 37 is in a range of from 0.30 to 0.45 times the tread width TW.

Figure 8:
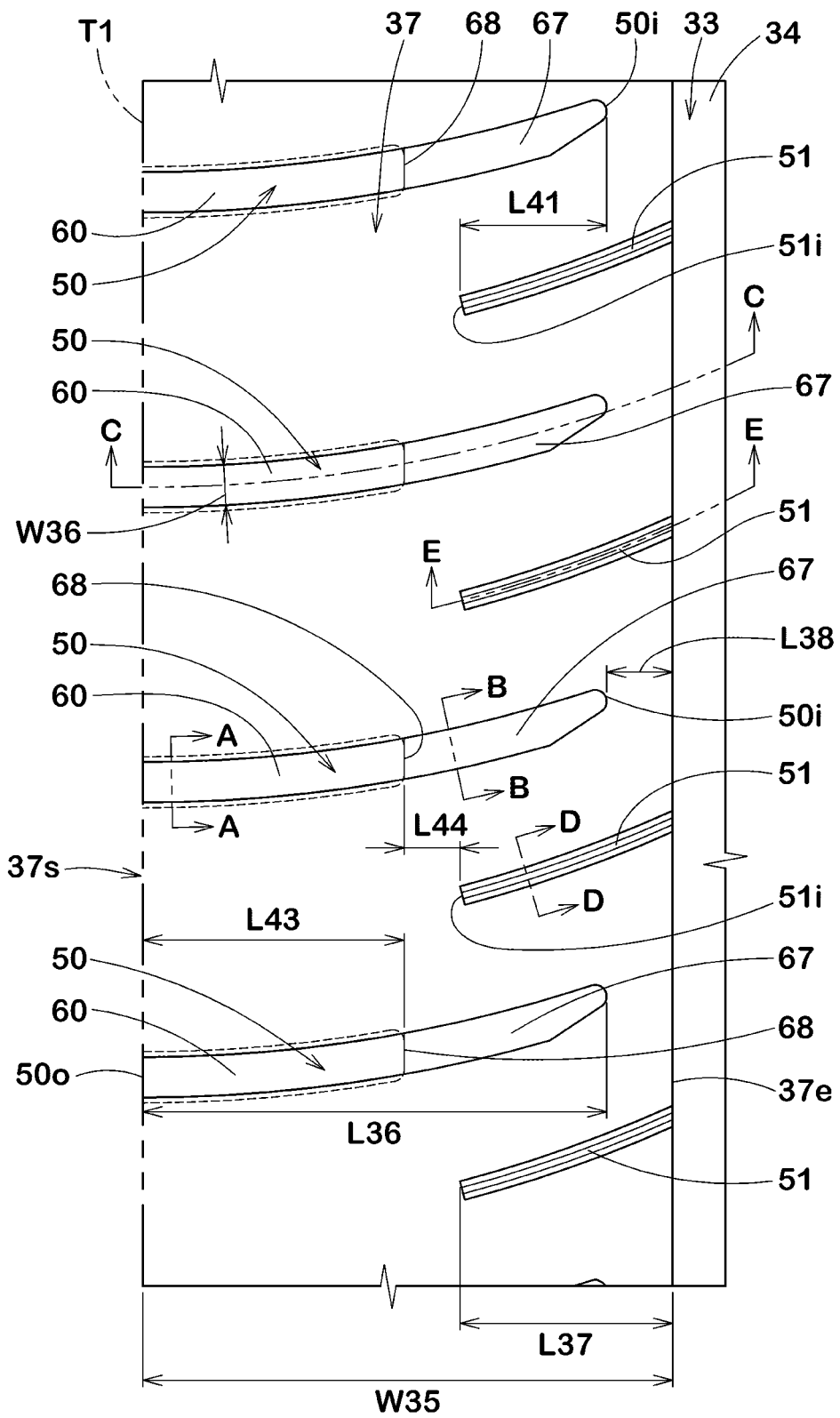
FIG. 8 is an enlarged view of a first shoulder land portion of FIG. 7.

FIG. 8 illustrates an enlarged view of the first shoulder land portion 37. As illustrated in FIG. 8, the first shoulder land portion 37 according to the fourth embodiment is provided with first shoulder lateral grooves 50. Preferably, the first shoulder lateral grooves 50 extend inwardly in the tyre axial direction from the first tread edge T1 and terminates within the first shoulder land portion 37.

The first shoulder lateral grooves 50, for example, are curved smoothly. Preferably, each first shoulder lateral groove 50, for example, has an angle with respect to the tyre axial direction and which gradually increases from the first tread edge T1 toward the first crown main groove 34. The angle of each first shoulder lateral groove 50 is preferably in a range of from 0 to 20 degrees with respect to the tyre axial direction.

Preferably, a length L36 in the tyre axial direction of each first shoulder lateral groove 50 is in a range of from 0.70 to 0.92 times the width W35 of the first shoulder land portion 37. Further, a groove width W36 of each first shoulder lateral groove 50 is preferably in a range of from 0.25 to 0.45 times the groove widths W31 of the main grooves 33. Note that the first shoulder lateral grooves 50 are not limited to such an aspect.

At least one of the first shoulder lateral grooves 50 according to the fourth embodiment includes the widening-width portion 60 at least partially.

Figure 9:
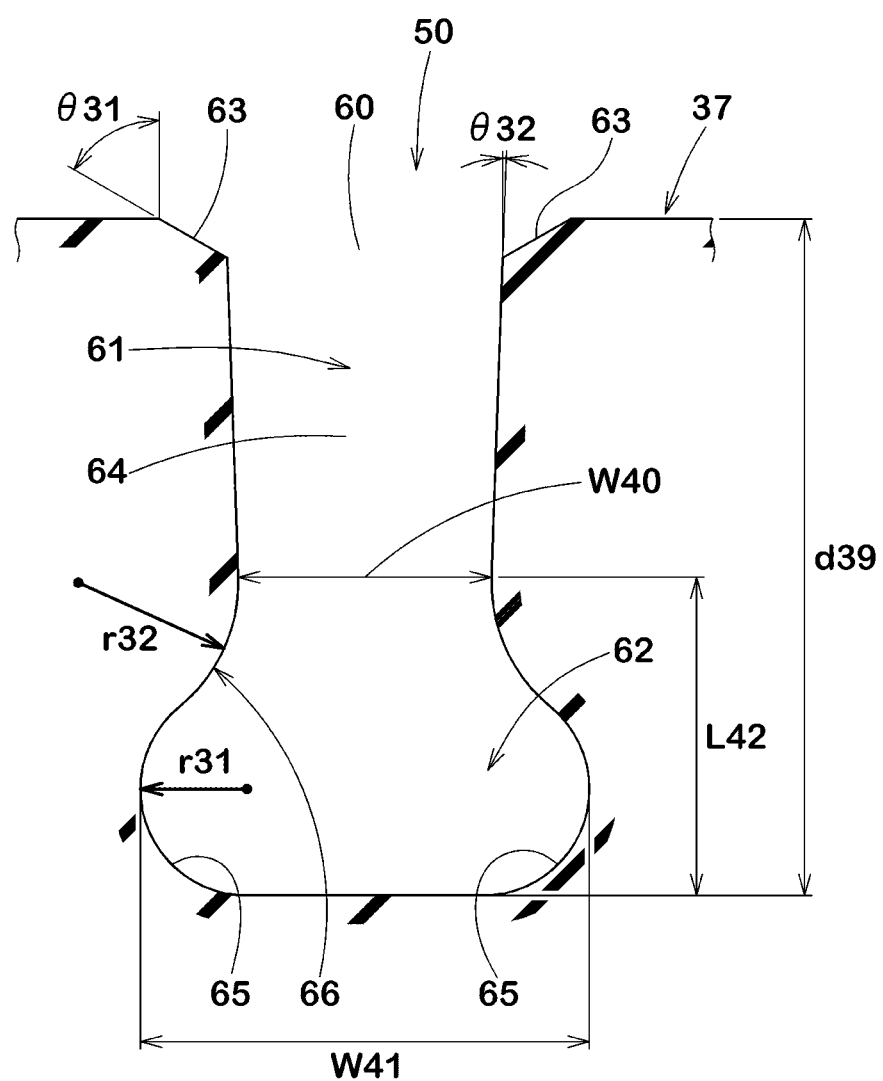
FIG. 9 is a cross-sectional view taken along line A-A of FIG. 8.

FIG. 9 illustrates a cross-sectional view taken along line A-A of FIG. 8. FIG. 9 is a cross-sectional view of the widening-width portion 60 of the at least one first shoulder lateral groove 50. As illustrated in FIG. 9, in the fourth embodiment, the widening-width portion 60 includes a first groove portion 61 extending inwardly in the tyre radial direction from a ground contact surface of the first shoulder land portion 37, and a second groove portion 62 located inwardly in the tyre radial direction of the first groove portion 61 and having a groove width greater than that of the first groove portion 61.

Such a first shoulder lateral groove 50 including the widening-width portion 60 provides a small opening area on the ground contact surface while maintaining a sufficient groove volume, and thus a large ground contact area can be obtained on the first shoulder land portion 37. The land portion having a large ground contact area can generate a large cornering force, leading to better steering stability. In addition, the second groove portion 62 of the first shoulder lateral groove 50 helps to moderate circumferential stiffness of the first shoulder land portion 37 appropriately, improving ride comfort. Thus, the tyre 31 according to the fourth embodiment can improve ride comfort as well as steering stability.

The first groove portion 61, for example, may include one or more chamfer portions 63 extending from groove edges of the first shoulder lateral grooves 50 with an inclination. An angle θ31 of the chamfer portions 63 is preferably in a range of from 55 to 65 degrees with respect to a tyre normal line. Such chamfer portions 63 can help to suppress uneven wear of groove edges of the first shoulder lateral groove 50.

The first groove portion 61, for example, includes a main portion 64 which is located inwardly in the tyre radial direction of the chamfer portions 63, and is connected to the chamfer portions 63. The main portion 64, for example, is a portion in which a distance between a pair of groove walls facing with one another is constant inwardly in the tyre radial direction or slightly decreases. An angle θ32 of the groove walls of the main portion 64 is in a range of from 0 to 4 degrees with respect to a tread normal line.

The second groove portion 62, for example, is connected to the main portion 64 of the first groove portion 61, and a groove width thereof increases inwardly in the tyre radial direction from the main portion 64. Note a boundary between the first groove portion 61 and the second groove portion 62 is a position at which a distance between a pair of groove walls facing with each other starts increasing.

The maximum groove width W41 of the second groove portion 62 is preferably equal to or more than 1.30 times the minimum groove width W40 of the first groove portion 61, more preferably equal to or more than 1.50 times, but preferably equal to or less than 2.30 times, more preferably equal to or less than 2.00 times. Such a second groove portion 62 can be helpful to improve ride comfort and steering stability in a well-balanced manner.

In the same point of view, a length L42 in the tyre radial direction of the second groove portion 62 is preferably equal to or more than 0.20 times the maximum groove depth d39 of the widening-width portion 60 of the first shoulder lateral grooves 50, more preferably equal to or more than 0.30 times, but preferably equal to or less than 0.70 times, more preferably equal to or less than 0.50 times.

The second groove portion 62, for example, includes a pair of curved surfaces 65 which are dented in the groove width direction so as to include the maximum groove width position. Preferably, the curved surfaces 65 each have a radius r31 of curvature of from 0.5 to 1.5 mm.

In this embodiment, the first groove portion 61 is connected to the second groove portion 62 through a neck portion 66 which has a pair of groove walls curving to protrude inwardly in the groove width direction. Preferably, the pair of groove walls of neck portion 66 has a radius of curvature r32 of from 0.6 to 2.5 mm, more preferably 1.0 to 2.0 mm.

As illustrated in FIG. 8, in the fourth embodiment, the first shoulder land portion 37 includes a shoulder surface 37s extending inwardly in the tyre radial direction from the first tread edge T1. Preferably, the first shoulder lateral grooves 50 includes openings 50o on the shoulder surface 37s. At least one widening-width portion 60 according to the fourth embodiment is configured to include such one of the openings 50o. Thus, the first shoulder lateral grooves 50 can improve wet performance due to the widening-width portion 60.

In the fourth embodiment, the first shoulder lateral grooves 50 each include the widening-width portion 60 and a non-widening-width portion 67 located inwardly of the widening-width portion 50 in the tyre axial direction.

Figure 10:
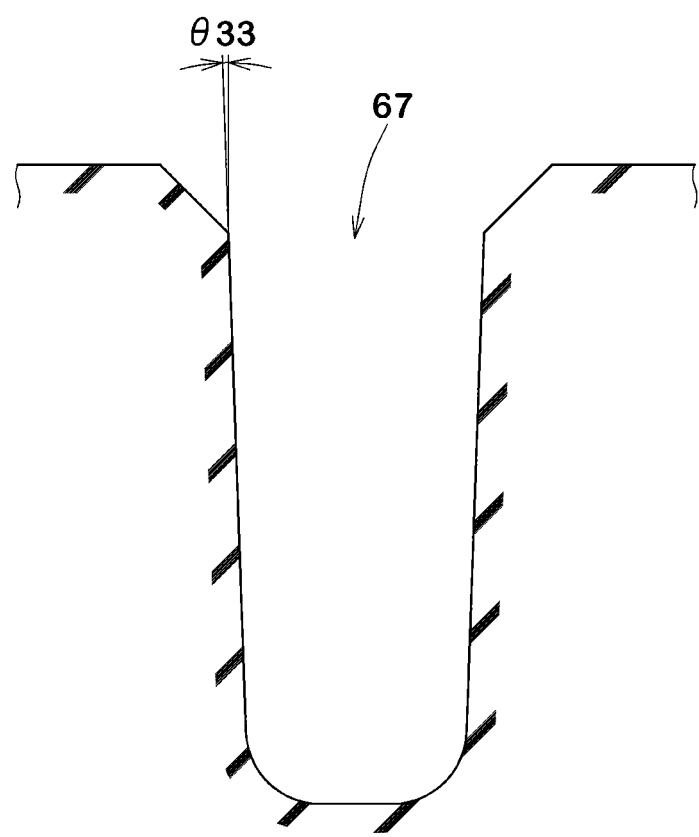
FIG. 10 is a cross-sectional view taken along line B-B of FIG. 8.

FIG. 10 illustrates a cross-sectional view taken along line B-B of FIG. 8. FIG. 10 is a cross-sectional view of the non-widening-width portion 67 of one first shoulder lateral groove 50. As illustrated in FIG. 10, the non-widening-width portion 67 according to the fourth embodiment has a groove width which is constant or decreases from the tread surface toward a groove bottom thereof. Preferably, an angle θ33 of groove walls of the non-widening-width portion 67 is in a range of from 0 to 4 degrees with respect to a tread normal line.

As illustrated in FIG. 8, it is preferable that a boundary 68 between the widening-width portion 60 and the non-widening-width portion 67 is located inward in the tyre axial direction with respect to a middle position in the tyre axial direction of said one first shoulder lateral groove 50. Specifically, a length L43 in the tyre axial direction of each widening-width portion 60 is preferably in a range of from 0.55 to 0.70 times the length L36 of each first shoulder lateral groove 50.

The first shoulder lateral grooves 50 each of which includes the widening-width portion 60 as well as the non-widening-width portion 67 can improve ride comfort and steering stability in a well-balanced manner.

Figure 11:
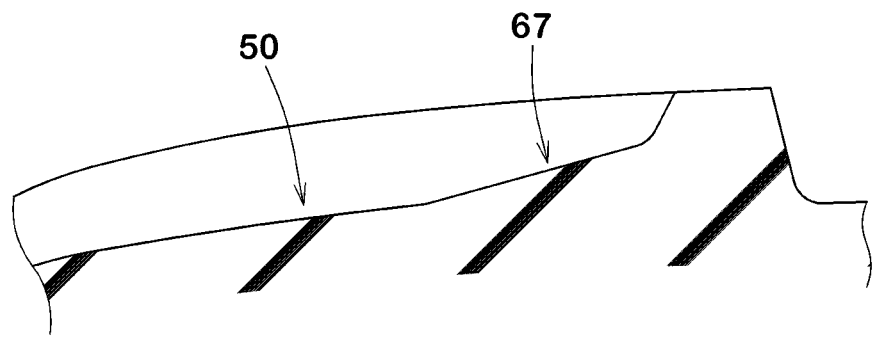
FIG. 11 is a cross-sectional view taken along line C-C of FIG. 8.

FIG. 11 illustrates a cross-sectional view of one first shoulder lateral groove 50 taken along line C-C of FIG. 8. As illustrated in FIG. 11, preferably, the non-widening-width portion 67 of the first shoulder lateral groove 50 has a groove depth which decreases gradually inwardly in the tyre axial direction. Thus, the non-widening-width portion 67 can maintain sufficient stiffness of the first shoulder land portion 37, leading to better steering stability.

As illustrated in FIG. 8, the first shoulder land portion 37 according to the fourth embodiment is provided with first shoulder sipes 51. Preferably, the first shoulder sipes 51 extend from an inner longitudinal edge 37e in the tyre axial direction of the first shoulder land portion 37 and have terminal ends 51i within the first shoulder land portion 37.

As used herein, "sipe" is defined as an incision having a main portion that has a width of less than 2.0 mm. Preferably, the width of sipe is less than 1.5 mm, more preferably of from 0.4 to 1.0 mm. The sipe, for example, may have an opening width of from 1.5 to 2.5 mm on a ground contact surface.

The first shoulder sipes 51, for example, are curved so as to protrude in the same direction as a curve of each first shoulder lateral groove 50. Preferably, an angle of each first shoulder sipe 51 with respect to the tyre axial direction may be in the same range as the first shoulder lateral grooves 50. Preferably, each first shoulder sipes 51 is curved to have a radius of curvature of from 100 to 150 mm.

A length L37 in the tyre axial direction of each first shoulder sipes 51 is preferably in a range of from 0.30 to 0.70 times the width W35 of the first shoulder land portion 37.

Preferably, the terminal ends 51i of first shoulder sipes 51 are located inward in the tyre axial direction with respect to boundaries 68 between the widening-width portions 60 and the non-widening-width portions 67. This makes it possible to enhance stiffness of the boundaries 68, leading to better steering stability.

Distances L44 in the tyre axial direction from the boundaries 68 to the terminal ends 51i of first shoulder sipes 51 are preferably in a range of from 0.05 to 0.10 times the width W35 of the first shoulder land portion 37.

Distances L41 in the tyre axial direction from the terminal ends 50i of the first shoulder lateral grooves 50 to the terminal ends 51i of the first shoulder sipes 51 are preferably in a range of from 0.20 to 0.35 times the width W35 of the first shoulder land portion 37. This makes it possible to provide better initial responsiveness while maintaining better ride comfort.

Figure 12:
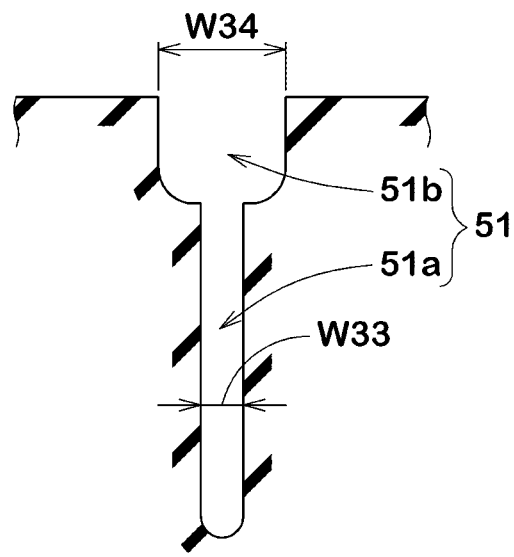
FIG. 12 is a cross-sectional view taken along line D-D of FIG. 8.

FIG. 12 illustrates a cross-sectional view taken along line D-D of FIG. 8. FIG. 12 is a cross-sectional view of one first shoulder sipe 51 perpendicular to the longitudinal direction. As illustrated in FIG. 12, each first shoulder sipe 51 according to the fourth embodiment includes a main portion 51a and a wide portion 51b located radially outward of the main portion 51a and having a width greater than that of the main portion 51a.

Preferably, the main portion 51a has a width W33 of from 0.4 to 0.8 mm. Preferably, the wide portion 51b has a width W34 of from 1.0 to 2.0 mm. Preferably, the width W34 of the wide portion 51b is 1.5 to 4.0 times the width W34 of the main portion 51a. Such a first shoulder sipes 51 can moderate stiffness of the first shoulder land portion 37 sufficiently, leading to better ride comfort.

Figure 13:
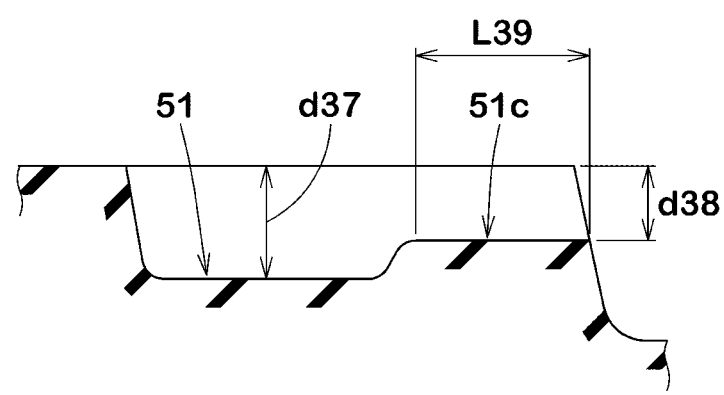
FIG. 13 is a cross-sectional view taken along line E-E of FIG. 8.

FIG. 13 illustrates a cross-sectional view of one first shoulder sipe 51 taken along line E-E of FIG. 8. As illustrated in FIG. 13, one or more first shoulder sipes 51 according to the fourth embodiment include a shallow bottom portion 51c having a depth shallower than the maximum depth of the sipe. The first shoulder sipe 51, for example, has the shallow bottom portion 51c on an inner side thereof in the tyre axial direction. The shallow bottom portion 51c can be helpful to improve steering stability by preventing the sipe from opening excessively.

Preferably, a depth d38 of the shallow bottom portion 51c is in a range of from 0.15 to 0.50 times the depths of the main grooves 33. Further, the depth d38 of shallow bottom portion 51c is preferably in a range of from 0.60 to 0.75 times the maximum depth d37 of the first shoulder sipe 51.

Preferably, a length L39 in the tyre axial direction of the shallow bottom portion 51c is greater than distances L38 (shown in FIG. 8) from an axially outer groove edge of the first crown main groove 34 to the terminal ends 50i of the first shoulder lateral grooves 50. Such a shallow bottom portion 51c can prevent the first shoulder sipes 51 from opening excessively, improving steering stability and uneven wear resistance.

Figure 14:
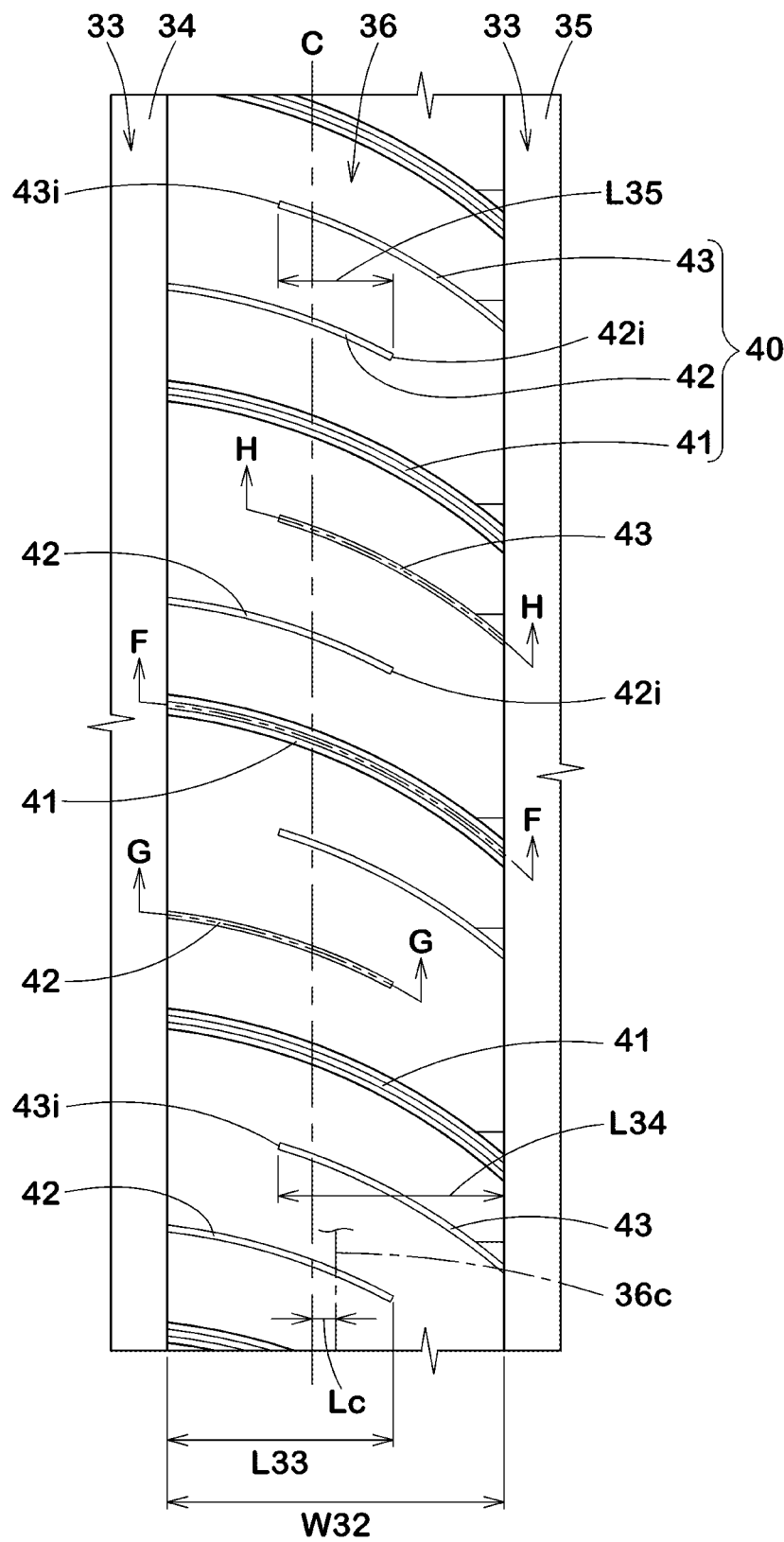
FIG. 14 is an enlarged view of a crown land portion of FIG. 7.

FIG. 14 illustrates an enlarged view of the crown land portion 36. As illustrated in FIG. 14, a width W32 of the crown land portion 36 is preferably in a range of from 0.15 to 0.25 times the tread width TW (shown in FIG. 7, and the same hereinafter). Further, the center position 36c in the tyre axial direction of the crown land portion 36 is preferably located on the second crown main groove 35 side with respect to the tyre equator C. Thus, in the fourth embodiment, a width of the crown land portion 36 which occupies the inboard tread portion 32B enlarges, thereby improving steering stability.

Preferably, the difference Lc between the center position 36c of the crown land portion 36 and the tyre equator C is in a range of from 0.05 to 0.10 times the width W32 of the crown land portion 36. Note that the difference Lc is an axial distance.

In the fourth embodiment, the crown land portion 36 is provided with crown sipes 40. The crown sipes 40, for example, include first crown sipes 41, second crown sipes 42 and third crown sipes 43.

The first crown sipes 41, for example, extend to communicate the first crown main groove 34 and the second crown main groove 35. The second crown sipes 42, for example, extend from the first crown main groove 34 and terminate within the crown land portion 36. The third crown sipes 43, for example, extend from the second crown main groove 35 and terminate within the crown land portion 36.

Such crown sipes 40 can moderate stiffness of the crown land portion 36 appropriately, improving ride comfort while maintaining steering stability. Further, each crown sipe 40 can be helpful to uniformize stiffness distribution of the crown land portion 36 to suppress uneven wear of the crown land portion 36.

The second crown sipes 42 and the third crown sipes 43 which are both terminate within the crown land portion 36 can make the ground contact surface of the crown land portion 36 generate torsional deformation easily so that initial responsive performance of the tyre can be improved.

The first crown sipes 41, for example, are curved to protrude toward one side in the tyre circumferential direction, e.g., an arc shaped manner. Preferably, a radius of curvature of each first crown sipe 41 is of from 45 to 65 mm. Preferably, the radius of curvature of the first crown sipes 41 is smaller than the radius of curvature of each first shoulder sipe 51.

In the fourth embodiment, an angle of each first crown sipe 41 with respect to the tyre axial direction gradually increases from the first crown main groove 34 toward the second crown main groove 35. The angle of each first crown sipe 41 is preferably in a range of from 5 to 30 degrees. The first crown sipes 41 can generate friction force in various directions using the sipe edges.

Preferably, the first crown sipes 41, in a cross-sectional view perpendicular to the longitudinal direction, have the same cross section as the first shoulder sipes 51. That is, each first crown sipe 41 includes a main portion and a wide portion located radially outward of the main portion and having a width greater than that of the main portion (not illustrated). Such a first crown sipe 41 helps to improve ride comfort.

Figure 15:
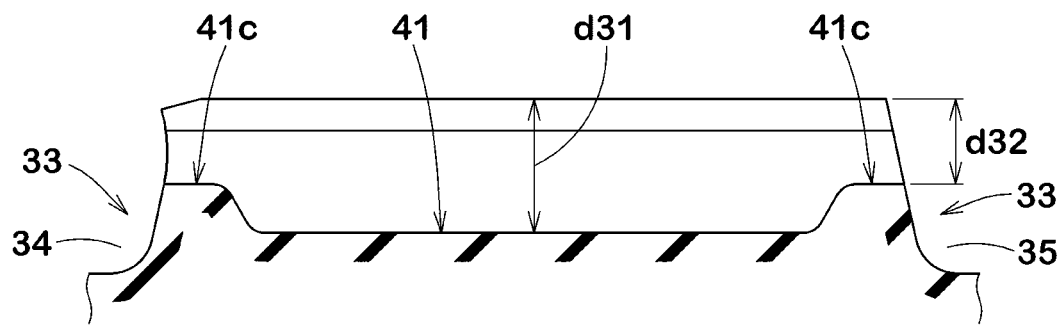
FIG. 15 is a cross-sectional view taken along line F-F of FIG. 14.

FIG. 15 illustrates a cross-sectional view of one first crown sipe 41 taken along line F-F of FIG. 14. As illustrated in FIG. 15, each first crown sipe 41, for example, has at least one shallow bottom portion 41c having a depth shallower than the maximum depth of the sipe. In the fourth embodiment, the first crown sipe 41 may have two shallow bottom portions 41c which are arranged on the respective both ends in the tyre axial direction. Thus, the first crown sipe 41 can be prevented from opening excessively when a ground contact pressure acts on the crown land portion 36, improving steering stability as well as uneven wear resistance further.

The maximum depth d31 of each first crown sipe 41 is preferably in a range of from 0.60 to 1.00 times the depths of the main grooves 33. The depths d32 of the shallow bottom portions 41c of the first crown sipes 41 are preferably in a range of from 0.40 to 0.85 times the maximum depth d31 of the sipe.

As illustrated in FIG. 14, each of the second crown sipes 42 and the third crown sipes 43 according to the fourth embodiment is arranged between two first crown sipes 41 which are adjacent with each other in the tyre circumferential direction. Lengths L33 and L34 in the tyre axial direction of the second crown sipes 42 and the third crown sipes 43, respectively, are preferably in a range of from 0.50 to 0.80 times the width W32 of the crown land portion 36.

Preferably, the second crown sipes 42 and the third crown sipes 43 respectively have terminal ends 42i and 43i within the crown land portion 36. In the fourth embodiment, the terminal ends 43i of the third crown sipes 43 are located on the first crown main groove 34 side with respect to the terminal ends 42i of the second crown sipes 42.

Sipe overlapping lengths L35 which are lengths in the tyre axial direction from the terminal ends 42i of the second crown sipes 42 to the terminal ends 43i of the third crown sipes 43 are preferably equal to or more than 0.25 times the width W32 of the crown land portion 36, more preferably equal to or more than 0.30 times, but preferably equal to or less than 0.45 times, more preferably equal to or less than 0.40 times. Such an arrangement of the second crown sipes 42 and the third crown sipes 43 can be helpful to make the crown land portion 36 generate torsional deformation easily so that initial responsive performance of the tyre can be improved.

The second crown sipes 42 and the third crown sipes 43, for example, are curved so as to protrude a direction same as a direction toward which the first crown sipes 41 protrude. Thus, angles of the second crown sipes 42 and the third crown sipes 43 with respect to the tyre axial direction increase gradually from the first crown main groove 34 side to the second crown main groove 35 side. It is preferable that the angles and radii of curvature of the second crown sipes 42 and the third crown sipes 43 are determined in the same ranges as the first crown sipes 41.

Preferably, the second crown sipes 42 and the third crown sipes 43 extend from the ground contact surface of the land portion to bottoms thereof at a width of from 0.4 to 0.8 mm. Thus, on the outer surface of the tread portion 32, opening widths of the first crown sipes 41 are larger than the opening widths of the second crown sipes 42 and the third crown sipes 43. This structure can help to improve uneven wear resistance around the second crown sipes 42 and the third crown sipes 43.

Figure 16:
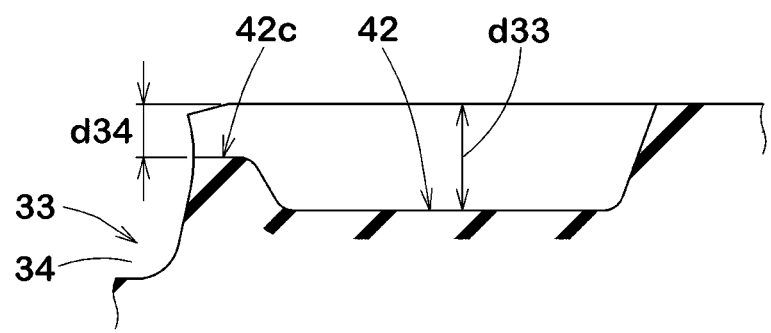
FIG. 16 is a cross-sectional view taken along line G-G of FIG. 14.
Figure 17:
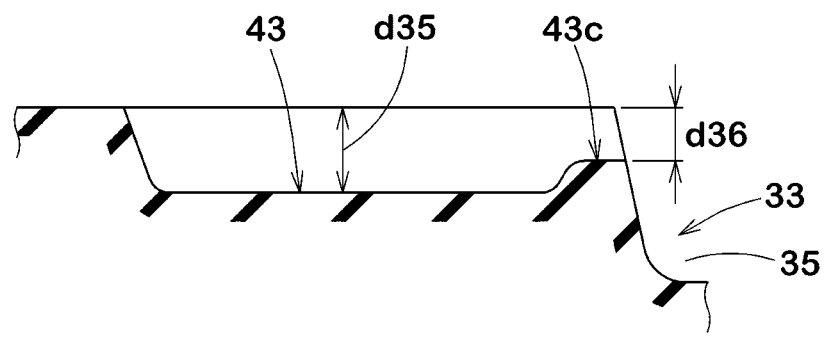
FIG. 17 is a cross-sectional view taken along line H-H of FIG. 14.

FIG. 16 illustrates a cross-sectional view of one second crown sipe 42 taken along line G-G of FIG. 14. FIG. 17 illustrates a cross-sectional view of one third crown sipe 43 taken along line H-H of FIG. 14. As illustrated in FIG. 15 to FIG. 17, the maximum depth d33 of each second crown sipe 42 and the maximum depth d35 of each third crown sipe 43 are preferably smaller than the maximum depth d31 of each first crown sipe 41.

Preferably, the maximum depth d33 of each second crown sipe 42 and the maximum depth d35 of each third crown sipe 43 are preferably in a range of from 0.40 to 0.90 times the maximum depth d31 of the first crown sipes 41. Such second crown sipes 42 and third crown sipes 43 can suppress excessive reduction in stiffness of the crown land portion 36, helping to improve steering stability.

It is preferable that the maximum depth d33 of each second crown sipes 42 is greater than the maximum depth d35 of each third crown sipe 43.

In order to further improve initial responsiveness of the tyre, it is preferable that the maximum depth d35 of each third crown sipe 43 is smaller than the depth d32 of the shallow bottom portion 41c of each first crown sipe 41.

Preferably, each second crown sipe 42 includes a shallow bottom portion 42c having a depth d34 smaller than the maximum depth d33. Similarly, each third crown sipe 43 preferably includes a shallow bottom portion 43c having a depth d36 smaller than the maximum depth d35. In the fourth embodiment, each of the shallow bottom portions 42c and 43c is provided on the main groove 33 side. Such shallow bottom portions 42c and 43c can prevent the sipes from opening excessively, helping to improve steering stability.

Preferably, the depths d34 and d36 of the shallow bottom portion 42c of each second crown sipe 42 and the shallow bottom portion 43c of each third crown sipes 43, respectively, are in a range of from 0.15 to 0.30 times the depth of the main grooves 33. In some preferred embodiments, the depths d34 and d36 of the shallow bottom portion 42c of each second crown sipe 42 and the shallow bottom portion 43c of each third crown sipe 43, respectively, are smaller than the depth d32 of the shallow bottom portion 41c of each first crown sipe 41. This makes it possible to enhance stiffness around the second crown sipes 42 and the third crown sipes 43, uneven wear resistance can be improved.

Figure 18:
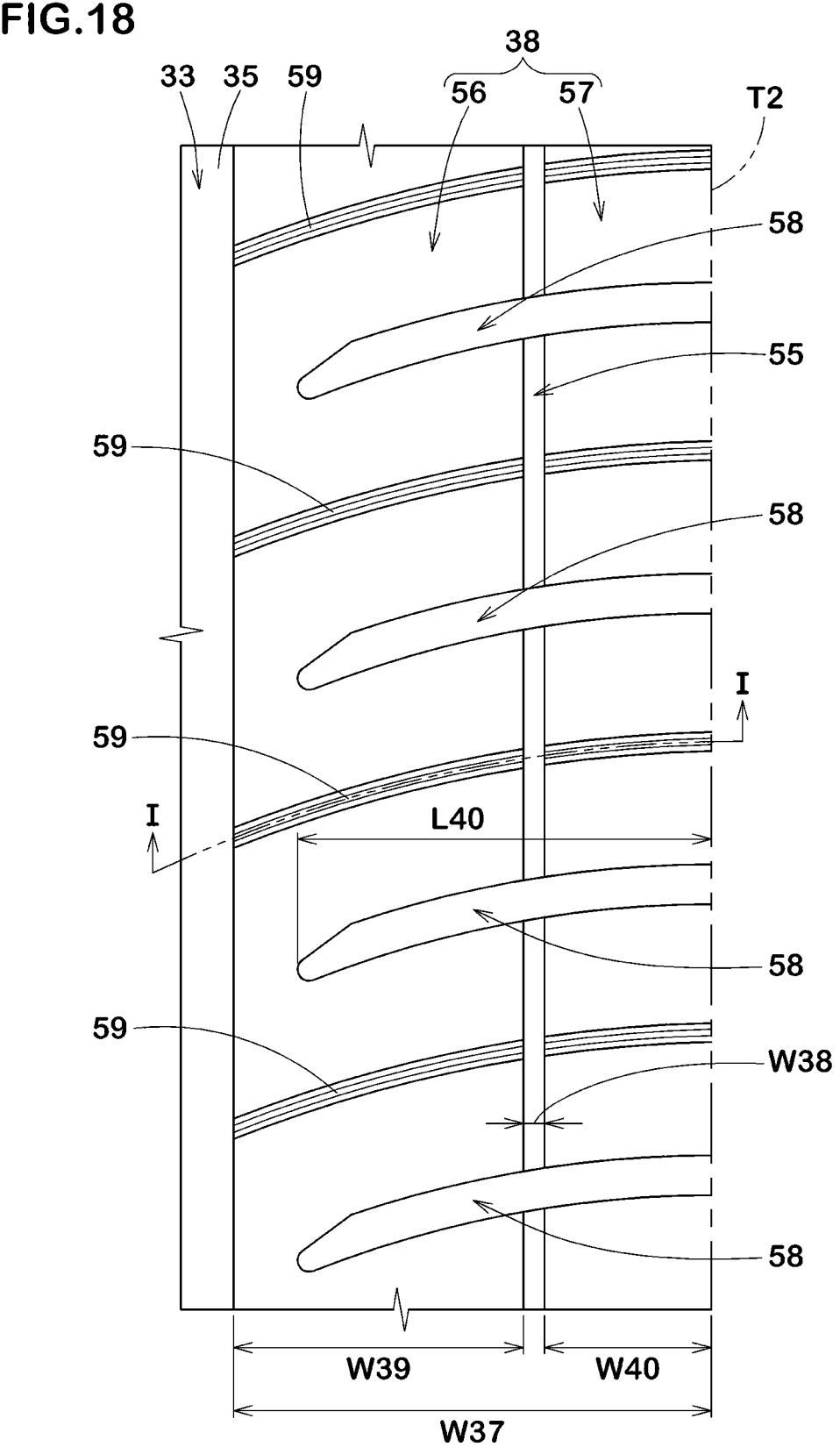
FIG. 18 is an enlarged view of a second shoulder land portion of FIG. 7.

FIG. 18 illustrates an enlarged view of the second shoulder land portion 38. As illustrated in FIG. 18, the second shoulder land portion 38 has a width W37 in the tyre axial direction in a range of from 0.25 to 0.35 times the tread width TW.

In the fourth embodiment, the second shoulder land portion 38 is provided with a longitudinal narrow groove 55. The longitudinal narrow groove 55 has a groove width and a depth each of which is less than 5 mm, and thus it is distinguishing from the above main grooves 33. The groove width W38 of the longitudinal narrow groove 55 is preferably in a range of from 0.20 to 0.30 times the groove widths W31 (shown in FIG. 7) of the main grooves 33. The second shoulder land portion 38 includes a first portion 56 defined between the second crown main groove 35 and the longitudinal narrow groove 55, and a second portion 57 defined between the longitudinal narrow groove 55 and the second tread edge T2.

Preferably, a width W39 in the tyre axial direction of the first portion 56 is in a range of from 0.55 to 0.65 times the width W37 of the second shoulder land portion 38. Preferably, a width W40 in the tyre axial direction of the second portion 57 is in a range of from the width W37 of the second shoulder land portion 38.

The second shoulder land portion 38 according to the fourth embodiment is further provided with second shoulder lateral grooves 58 and second shoulder sipes 59. The second shoulder lateral grooves 58, for example, extend from the second tread edge T2 and terminate within the second shoulder land portion 38. The second shoulder sipes 59, for example, extend from the second crown main groove 35 to the second tread edge T2.

The second shoulder lateral grooves 58, for example, traverse the longitudinal narrow groove 55, and terminate within the first portion 56 of the second shoulder land portion 38. Preferably, lengths L40 in the tyre axial direction of the second shoulder lateral grooves 58 are in a range of from 0.80 to 0.90 times the width W37 of the second shoulder land portion 38.

Preferably, the second shoulder lateral grooves 58 do not include any widening-width portion as described above, but are configured to have a conventional cross-sectional shape of lateral grooves. That is, the second shoulder lateral grooves 58 according to the fourth embodiment, in a cross-sectional view perpendicular to the longitudinal direction thereof, each have a groove width which gradually decreases from a ground contact surface of the second shoulder land portion 38 to the groove bottom. Such second shoulder lateral grooves 58 help to exert better steering stability.

Preferably, depths of the second shoulder lateral grooves 58 decrease gradually inwardly in the tyre axial direction between the longitudinal narrow groove 55 and the second crown main groove 35. Such second shoulder lateral grooves 58 help to improve ride comfort and steering stability in a well-balanced manner.

The second shoulder sipes 59, for example, are curved in such a manner as to protrude one side in the tyre circumferential direction (e.g., an arc shaped manner). A radius of curvature of each second shoulder sipe 59 is greater than that of the first crown sipes 41. Preferably, the radius of curvature of each second shoulder sipe 59 is in a range of from 120 to 150 mm.

Preferably, the second shoulder sipes 59, in a cross-sectional view perpendicular to the longitudinal direction thereof, have the same cross-section as the first crown sipes 41. That is, the second shoulder sipes 59 each include a main portion and a wide portion located radially outward of the main portion and having a width greater than that of the main portion (not illustrated). Such second shoulder sipes 59 help to improve ride comfort.

Figure 19:
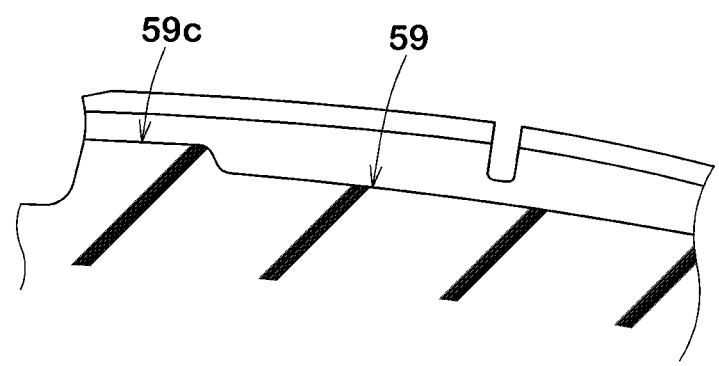
FIG. 19 is a cross-sectional view taken along line I-I of FIG. 18.

FIG. 19 illustrates a cross-sectional view of one second shoulder sipe 59 taken along line I-I of FIG. 18. As illustrated in FIG. 19, each second shoulder sipe 59, for example, includes a shallow bottom portion 59c having a depth smaller than the maximum depth of the sipe. Each second shoulder sipes 59 according to the fourth embodiment includes the shallow bottom portion 59c which is arranged on the inner end in the tyre axial direction with a certain width in the tyre axial direction. The shallow bottom portion 59c can prevent the second shoulder sipe 59 from opening excessively, helping to improve steering stability and uneven wear resistance.

$S_b/S_a$ of a total actual ground contact area Sb to a vertical ground contact area Sa that is obtained all grooves and sipes thereon are filled up.

While the particularly preferable embodiments in accordance with the present disclosure have been described in detail, the present disclosure is not limited to the illustrated embodiments, but can be modified and carried out in various aspects.

EXAMPLE

Tyres, 195/65R15, having a basic tread pattern shown in FIG. 7 were prototyped based on the detail shown in Table 1. As a comparative example, a tyre in which the first shoulder lateral grooves have no widening-width portion was prototyped. The tyre of the comparative example had the same tread pattern as FIG. 7 except for the above structure.

Then, steering stability and ride comfort of each test tyres was tested.

The common specification and the testing methods for the test tyres are as follows.
Rim: 15×6.0
Tyre inner pressure: 200 kPa
Test vehicle: front wheel drive vehicle having displacement of 2000 cc
Tyre location: all wheels
Steering Stability Test:
  A test driver drove the test vehicle to which each test tyre was attached on a dry paved road to evaluate steering stability (including initial responsiveness at cornering) by the driver's sense. The test results are shown in Table 1 using a scoring system where Reference is set to 100. The larger value indicates better steering stability.
Ride Comfort Test:
  A test driver drove the test vehicle to which each test tyre was attached on a dry paved road to evaluate ride comfort by the driver's sense. The test results are shown in Table 1 using a scoring system where Reference is set to 100. The larger value indicates better ride comfort.
Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Widening-width portion | none | presence | presence | presence | presence | presence | presence | presence | presence | presence |
| Widths W41 of second groove portions/widths W40 of first groove portions | — | 1.75 | 1.30 | 1.50 | 2.00 | 2.30 | 1.75 | 1.75 | 1.75 | 1.75 |
| Lengths L42 of second groove portions/depths d39 of first shoulder lateral grooves | — | 0.32 | 0.32 | 0.32 | 0.32 | 0.32 | 0.20 | 0.30 | 0.50 | 0.70 |
| Steering stability (score) | 100 | 106 | 105 | 105 | 105 | 103 | 106 | 106 | 105 | 104 |
| Ride comfort (score) | 100 | 105 | 103 | 104 | 105 | 106 | 103 | 105 | 106 | 106 |

In the fourth embodiment, a width in the tyre axial direction of the shallow bottom portion 59c provided on each second shoulder sipe 59 is greater than a width in the tyre axial direction of the shallow bottom portion provided on each crown sipe 40. Such second shoulder sipes 59 help to suppress uneven wear of the second shoulder land portion 38.

As illustrated in FIG. 7, a land ratio of the outboard tread portion 32A is preferably greater than a land ratio of the inboard tread portion 32B. Thus, the outboard tread portion 32A can generate large cornering force to exert better steering stability. As used herein, "land ratio" means a radio From the test results, it is confirmed that the tyres of examples improve steering stability and ride comfort.

What is claimed is:
1. A tyre comprising:
  a tread portion comprising a tread surface provided with grooves;
  at least one of the grooves comprising a widening-width portion at least partially; and
  the widening-width portion comprising
  a first groove portion extending inwardly in a tyre radial direction from the tread surface, and a second groove portion located inwardly in the tyre radial direction of the first groove portion and having a groove width greater than that of the first groove portion, wherein
the first groove portion, upon receiving a maximum tyre load, has a gap between two groove walls thereof,
a length in the tyre radial direction of the second groove portion is in a range of from 0.20 to 0.70 times a maximum groove depth of the widening-width portion, and
in the widening-width portion, a groove bottom thereof has an innermost portion in the tyre radial direction, the innermost portion being located on a middle region in a groove width direction of the widening-width portion, wherein
the tread portion comprises a first shoulder land portion having a first tread edge and a second shoulder land portion having a second tread edge located on a side toward the center of a vehicle body when the tyre is mounted to a vehicle,
the first shoulder land portion is provided with first shoulder lateral grooves extending inwardly in a tyre axial direction from the first tread edge and terminating within the first shoulder land portion, and
the grooves are the first shoulder lateral grooves;
the second shoulder land portion is provided with second shoulder lateral grooves extending inwardly in the tyre axial direction from the second tread edge and terminating within the second shoulder land portion, and
the second shoulder lateral grooves do not include any widening-width portions.

2. The tyre according to claim 1, wherein
the second groove portion comprises a curved surface curving in a groove width direction.

3. The tyre according to claim 1, wherein
the first groove portion comprises a pair of plane groove walls arranged in parallel with each other so as to have a constant groove width in the tyre radial direction.

4. The tyre according to claim 1, wherein
a maximum groove width of the second groove portion is in a range of from 1.30 to 3.00 times a minimum groove width of the first groove portion.

5. The tyre according to claim 1, wherein
the first groove portion and the second groove portion extend at respective constant groove widths in a longitudinal direction of the widening-width portion.

6. The tyre according to claim 1, wherein
the tread portion comprises a first tread edge, and
the grooves are lateral grooves that open at the first tread edge.

7. The tyre according to claim 6, wherein
a length in a tyre axial direction of the first groove portion is equal to or more than 0.70 times a length in the tyre axial direction of the lateral grooves.

8. The tyre according to claim 1, wherein
the first shoulder land portion comprises a shoulder surface extending inwardly in the tyre radial direction from the first tread edge, and
the first shoulder lateral grooves comprise openings on the shoulder surface, and
the widening-width portion includes one of the openings.

9. The tyre according to claim 1, wherein
at least one of the first shoulder lateral grooves comprises the widening-width portion, and a non-widening-width portion located inwardly in the tyre axial direction of the widening-width portion, and
the non-widening-width portion has a groove width which is constant or decreases from the tread surface toward a groove bottom thereof.

10. The tyre according to claim 9, wherein
a groove depth of the non-widening-width portion decreases inwardly in the tyre axial direction.

11. The tyre according to claim 9, wherein
a boundary between the widening-width portion and the non-widening-width portion is located inward in the tyre axial direction with respect to a middle position in the tyre axial direction of the at least one of the first shoulder lateral grooves.

12. The tyre according to claim 9, wherein
the first shoulder land portion comprises a longitudinal edge extending in a tyre circumferential direction on an inner side thereof in the tyre axial direction,
the first shoulder land portion is provided with first shoulder sipes extending from the longitudinal edge and having terminal ends within the first shoulder land portion, and
the terminal ends of first shoulder sipes are located inward in the tyre axial direction with respect to a boundary between the widening-width portion and the non-widening-width portion.

13. The tyre according to claim 9, wherein
a length in the tyre axial direction of the widening-width portion is in a range of from 0.55 to 0.70 times a length of the at least one first shoulder lateral groove.

14. The tyre according to claim 1, wherein
the at least one of the grooves comprises the widening-width portion, and a non-widening-width portion located inwardly in the tyre axial direction of the widening-width portion, and
a length in the tyre axial direction of the widening-width portion is in a range of from 0.55 to 0.70 times a length of the at least one of the grooves.

15. A tyre comprising:
a tread portion comprising a tread surface provided with grooves;
at least one of the grooves comprising a widening-width portion at least partially; and
the widening-width portion comprising a first groove portion extending inwardly in a tyre radial direction from the tread surface, and a second groove portion located inwardly in the tyre radial direction of the first groove portion and having a groove width greater than that of the first groove portion, wherein
the tread portion comprises a first shoulder land portion having a first tread edge and a second shoulder land portion having a second tread edge located on a side toward the center of a vehicle body when the tyre is mounted to a vehicle,
the first shoulder land portion is provided with first shoulder lateral grooves extending inwardly in a tyre axial direction from the first tread edge and terminating within the first shoulder land portion; and
the grooves are the first shoulder lateral grooves at least one of which includes the widening-width portion and a non-widening-width portion located inwardly in the tyre axial direction of the widening-width portion,
the non-widening-width portion has a groove width which decreases from the tread surface toward a groove bottom thereof,
the second shoulder land portion is provided with second shoulder lateral grooves extending inwardly in the tyre axial direction from the second tread edge and terminating within the second shoulder land portion, and the second shoulder lateral grooves do not include any widening-width portions.

16. A tyre comprising:

a tread portion comprising a tread surface provided with grooves;

at least one of the grooves comprising a widening-width portion at least partially; and the widening-width portion comprising a first groove portion extending inwardly in a tyre radial direction from the tread surface, and a second groove portion located inwardly in the tyre radial direction of the first groove portion and having a groove width greater than that of the first groove portion, wherein the tread portion comprises a first shoulder land portion having a first tread edge and a second shoulder land portion having a second tread edge located on a side toward the center of a vehicle body when the tyre is mounted to a vehicle, the first shoulder land portion is provided with first shoulder lateral grooves extending inwardly in a tyre axial direction from the first tread edge and terminating within the first shoulder land portion; and the grooves are the first shoulder lateral grooves at least one of which includes the widening-width portion and a non-widening-width portion located inwardly in the tyre axial direction of the widening-width portion, a groove depth of the non-widening-width portion continuously decreases from a boundary between the widening-width portion and the non-widening-width portion inwardly in the tyre axial direction, the second shoulder land portion is provided with second shoulder lateral grooves extending inwardly in the tyre axial direction from the second tread edge and terminating within the second shoulder land portion, and the second shoulder lateral grooves do not include any widening-width portions.

\* \* \* \* \*